Oct. 27, 19  3,536,381
OPTICAL PROJECTION SYSTEM
Filed April 2, 1969
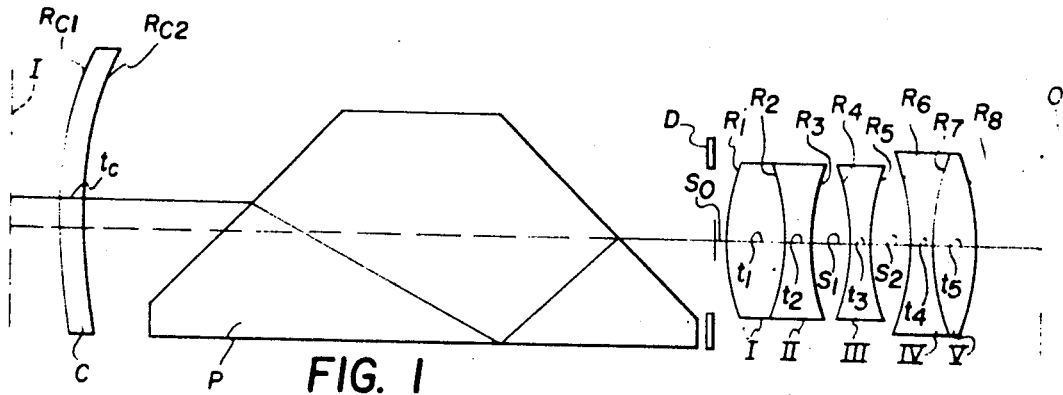
FIG. 1
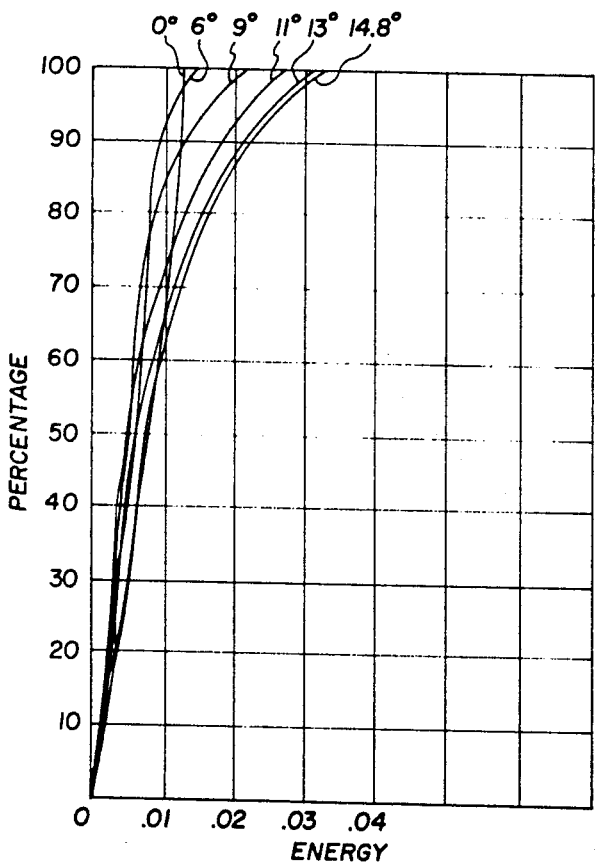
FIG. 2
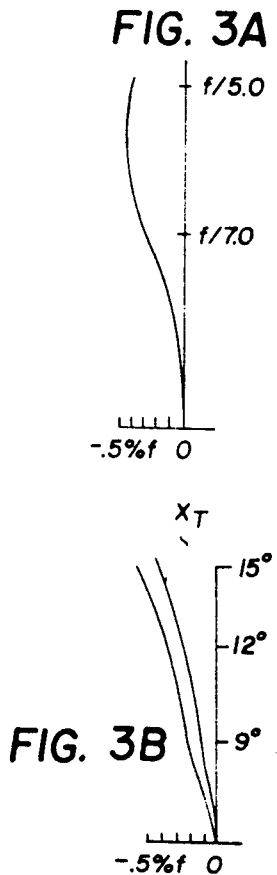
FIG. 3A
FIG. 3B
NICHOLAS M. PITULEY
INVENTOR.
ATTORNEYS

United States Patent Office 3,536,381
Patented Oct. 27, 1970

3,536,381
OPTICAL PROJECTION SYSTEM
Nicholas M. Pituley, Rochester, N.Y., assignor to Eastman Kodak Company, Rochester, N.Y., a corporation of New Jersey
Filed Apr. 2, 1969, Ser. No. 812,838
Int. Cl. G02b 17/00, 9/00
U.S. Cl. 350—203                               4 Claims

ABSTRACT OF THE DISCLOSURE

An optical system for projecting magnified images of documents at a variable angle of image rotation is disclosed, in which a collimator and prism are combined with one of several projection objectives. The prism provides a means for rotating the image with respect to the object. Each objective is a three component, five element lens with an outside stop which permits the location of the prism adjacent the diaphragm.

CROSS-REFERENCE TO A RELATED APPLICATION

Reference is made to commonly assigned copending U.S. patent application Ser. No. 730,316 entitled "Image Projection System," filed May 20, 1968 in the name of Robert P. Crandall.

BACKGROUND OF THE INVENTION

This invention relates to optical systems for projecting magnified images of documents and, more particularly to such systems adapted for rotating the projected image.

Objectives used for projecting magnified images are often combined with a collimator and rotatable dove prism for rotating the image with respect to the object. The collimator and the objective each work substantially at an infinite conjugate, and light passing through the system from any point in the object plane is substantially parallel between these two members. The prism is located in this parallel light to introduce a reflective surface into the system. Rotation of the prism about the optical axis of the system rotates the image with respect to the object at twice the rate of the prism rotation. The prism must be sufficiently large to accommodate the field of the objective, and it is usually the most expensive component in the system. In addition, an objective used for document copying must be of exceptional quality to provide the necessary resolution.

SUMMARY OF THE INVENTION

It is an object of this invention to provide an improved optical system for projecting magnified images of documents for reading and/or copying, and for rotating the projected image with respect to the object.

According to this invention, a projection system is provided comprising a collimator and a prism in combination with any selected one of several front-stop objectives, each consisting of five elements combined in three components. Each of these objectives comprises, from front (i.e. the long conjugate side) to rear, a front positive meniscus doublet, a biconcave negative element, and a rear positive doublet. Each positive meniscus doublet of each lens comprises an inner negative element adjacent the middle negative element, and a biconvex outer element. The use of front-stop objectives permits the location of the prism adjacent the stop. Consequently, the size of the prism can be minimized since the aperture is smallest near the stop.

The system magnifies the image with respect to the object by a factor which is dependent upon the ratio of the conjugate distances. Accordingly, the magnification can be varied by substituting other objectives having different focal lengths. Each of the objectives could be a scaled version of the same lens design, but this would result in a similarly scaled aperture. Consequently, the objectives of this invention are slightly different to enable the shorter focal length objectives to have a larger relative aperture, thus permitting a constant numerical aperture, thus permitting a constant numerical aperture at the long conjugate for all objectives.

BRIEF DESCRIPTION OF THE DRAWINGS

FIG. 1 shows a cross-section of a projection system according to the invention, including a collimator, a prism and an objective with its long conjugate on the left;

FIG. 2 shows a set of curves for the system using the objective disclosed in Example 1 below, depicting the energy distribution of light rays passing through the system at half-field angles of 0°, 6°, 9°, 11°, 13° and 14.8°, all at an aperture of f/5.0 and a magnification factor of 19'; and FIG. 3 shows two correction curves for the system using the objective disclosed in Example I below, showing (A) spherical aberration curves for the E line of the spectrum, and (B) curves for sagittal and tangential astigmatism.

DETAILED DESCRIPTION OF THE DRAWINGS

The optical system in FIG. 1 forms a magnified image in an image plane I of an object in an object plane O, and includes a collimator C and a dove prism P in combination with an objective comprising three components, including five elements I–V. The front component is a meniscus positive doublet concave to the rear consisting of a front biconvex element I and a rear biconcave element II. The middle component is a simple negative biconcave element III. The rear component is a positive doublet consisting of a front negative element V and a rear biconcave element V.

Numerical data for constructing a collimator having a focal length of 967.872 mm. for use in a system according to the invention is given in the following table.

| Element | $N_E$ | V | Radii (mm.) | Thickness (mm.) |
|---|---|---|---|---|
| C | 1.519 | 64.5 | $R_{C1}=406.65$<br>$R_{C2}=2126.5$ | $T_C=5.000$ |

The dove prism is located 13 mm. behind the collimator C and 7 mm. in front of the objective. The objective can be mounted for rotation about the optical axis of the objective to rotate the image with respect to the object. Light passing through the prism from any point in the object plane 0 is substantially parallel, since the object plane is located substantially in the focal plane of the objective. Parallel light from the objective is refracted at an inclined surface of the prism, reflected at its base and refracted again as it passes out of the opposite inclined plane of the prism, from which it is transmitted as parallel light to the collimator which forms an image in the image plane I. If desired the collimator and/or the objective can be mounted for rotation together with the prism, since the axis of rotation of the prism coincides with the optical axes of the objective and collimator.

According to one embodiment of the invention in FIG. 1, the prism is formed of a glass having an index of refraction for the E line of the spectrum of 1.726 and an index of dispersion of 29.3. The prism has base angles of 45° and its longer base is 65.5 mm. It is 23.5 mm. in height and 31.0 mm. wide with its longer base parallel to, and 5.0 mm. below, the optical axis of the objective. A paraxial ray from the objective entering the prism at 5.0 mm. above the base leaves the prism 13.0 mm. above the base, and is incident upon the collimator 8.0 mm. above the axes of the collimator. The collimator and objective are mounted coaxially to avoid translational motion of the image as it is rotated. Therefore, the optical axis of the objective is displaced by the prism from the optical axis of the collimator. This displacement permits a significant reduction in prism size, and consequently in collimator diameter, thus providing compactness and economy with negligible loss in quality. The aberrations introduced by this displacement are not significant because the collimator has a weak power.

Numerical data for constructing objective lenses having and equivalent focal length of 100 mm. for use in projection systems according to preferred embodiments of this invention is given in the following two tables of parameters, in which the lens elements are numbered from the front (i.e. long conjugate side), $N_E$ is the index of refraction of each element for the E line, V is the index of dispersion, and R, T and S refer respectively to the radii of curvature of the lens surfaces, the thicknesses of the lens elements and the airspaces between the elements, numbered by subscript from front to rear.

EXAMPLE I

| Elements | $N_E$ | V | Radii (mm.) | Thicknesses and spacings (mm.) |
|---|---|---|---|---|
| I | 1.70 | 56.1 | $R_1=44.53$ | $T_1=9.35$ |
| II | 1.578 | 41.4 | $R_2=-82.92$ | $T_2=2.55$ |
|  |  |  | $R_3=628.0$ | $S_1=5.01$ |
| III | 1.578 | 41.4 | $R_4=-61.10$ | $T_3=2.87$ |
|  |  |  | $R_5=36.20$ | $S_2=5.64$ |
| IV | 1.654 | 33.8 | $R_6=-787.6$ | $T_4=2.55$ |
| V | 1.749 | 43.9 | $R_7=31.68$ | $T_5=12.45$ |
|  |  |  | $R_8=51.18$ |  |

The objective described above as Example I is particularly adapted for use with the collimator and prism described above, if the objective is constructed at a focal length of 50.926 mm. working at a maximum relative aperture of f/5.0. The system using this objective has a magnification of 2.

The curves shown in FIG. 2 are a particularly pertinent criterion of lens performance because they represent the result of tracing hundreds of rays through the projection system from point sources at different field angles. The quality of the system is measured by plotting the percentage of light rays from each point source which are imaged in a spot on the image plane versus the size of the spot. Thus, the curves for different field angles give an accurate analysis of optical performance.

As shown by the curves in FIG. 2, the above system gives exceptionally high resolution. For example, it will be seen that approximately 85% of all the light rays within a field angle of 14.8° are imaged by the system within a spot having a diameter of 20 microns.

As shown by the curves in FIG. 3, a projection system according to the invention using the above objective in Example I is corrected to such a degree that spherical aberration for the E line of the spectrum is less than .5% of the focal length of the objective, and the sagittal and tangential fields are also less than .5% of the focal length. Distortion is less than .06%. Although the complete system is well corrected for aberrations as described above, the objective by itself is also a well-corrected lens. The maximum spherical aberration for the E line due to the objective alone is approximately .5%, the sagittal and tangential fields of the above objective vary less than .35% of the focal length of the objective, and distortion is less than .03%.

EXAMPLE II

| Elements | $N_E$ | V | Radii (mm.) | Thicknesses and spacings (mm.) |
|---|---|---|---|---|
| I | 1.70 | 56.1 | $R_1=39.43$ | $T_1=10.62$ |
| II | 1.578 | 41.4 | $R_2=-63.42$ | $T_2=2.44$ |
|  |  |  | $R_3=114.3$ | $S_1=3.37$ |
| III | 1.578 | 41.4 | $R_4=-67.17$ | $T_3=2.80$ |
|  |  |  | $R_5=33.60$ | $S_2=4.72$ |
| IV | 1.654 | 33.8 | $R_6=311.8$ | $T_4=6.81$ |
| V | 1.749 | 43.9 | $R_7=31.51$ | $T_5=8.59$ |
|  |  |  | $R_8=-55.87$ |  |

When the above objective, constructed at a focal length of 77.79, is used at a maximum relative aperture of f/7.0 with the collimator and prism described above, the system magnifies an image 12 times. Such a projection system including the objective lens in Example II is corrected to such a degree that spherical aberration and the sagittal and tangential fields are all less than .35% of the objective focal length. Distortion is less than .1%. As was the case with the objective in Example I, this objective is also well corrected for all aberrations with or without the collimator and prism. When this objective is used by itself, the spherical aberration for the D line is less than .3%f, the sagittal and tangential fields vary less than .06%f, and distortion is approximately .6%.

An apparatus for mounting the optical system of this invention is described in commonly assigned copending U.S. patent application Ser. No. 730,316 entitled "Image Projection System," filed May 20, 1968 in the name of Robert P. Crandall. The apparatus described in the Crandall application provides means for selectively mounting either one of the above objectives in optical alignment with the collimator on the opposite side of the prism. The prism and collimator are mounted for rotation about the optical axis of the objective and the entire optical system is mounted for axial adjustment to focus the image. Such a system could also include means for automatically adjusting the illumination of the object according to which of the objectives is included in the system.

The invention has been described in detail with particular reference to preferred embodiments thereof, but it will be understood that variations and modifications can be effected within the spirit and scope of the invention.

I claim:

1. An optical objective having an equivalent focal length of 100 mm. comprising in spaced optical alignment, a front positive meniscus doublet, a middle biconcave element, and a rear positive doublet, wherein the elements are constructed substantially according to the following parameters, in which the lens elements are numbered from the front, $N_E$ is the index of refraction for the E line of the spectrum, V is the index of dispersion and R, T and S refer respectively to the radii of curvature of the lens surfaces, the axial thicknesses of the lens elements and the axial spacings between the lens elements, numbered by subscript from front to rear:

| Elements | $N_E$ | V | Radii (mm.) | Thicknesses and spacings (mm.) |
|---|---|---|---|---|
| I | 1.70 | 56.1 | $R_1=44.53$ | $T_1=9.35$ |
| II | 1.578 | 41.4 | $R_2=-82.92$ | $T_2=2.55$ |
|  |  |  | $R_3=628.0$ | $S_1=5.01$ |
| III | 1.578 | 41.4 | $R_4=-61.10$ | $T_3=2.87$ |
|  |  |  | $R_5=36.20$ | $S_2=5.64$ |
| IV | 1.654 | 33.8 | $R_6=-787.6$ | $T_4=2.55$ |
| V | 1.749 | 43.9 | $R_7=31.68$ | $T_5=12.45$ |
|  |  |  | $R_8=-51.18$ |  |

2. An optical projection system including a front collimating component, a rotatable dove prism for rotating an image with respect to an object, and an objective as claimed in claim 1.

3. An optical objective having an equivalent focal length of 100 mm. comprising in spaced optical alignment, a front positive meniscus doublet, a middle biconcave element, and a rear positive doublet, wherein the elements are constructed substantially according to the following parameters, in which the lens elements are numbered from the front, $N_E$ is the index of refraction for the E line of the spectrum, V is the index of dispersion and R, T and S refer respectively to the radii of curvature of the lens surfaces, the axial thicknesses of the lens elements and the axial spacings between the lens elements, numbered by subscript from front to rear:

| Elements | $N_E$ | V | Radii (mm.) | Thicknesses and spacings (mm.) |
|---|---|---|---|---|
| I | 1.70 | 56.1 | $R_1=39.43$ | $T_1=10.62$ |
| II | 1.578 | 41.4 | $R_2=-63.42$ | $T_2=2.44$ |
|  |  |  | $R_3=114.3$ | $S_1=3.37$ |
| III | 1.578 | 41.4 | $R_4=67.17$ | $T_3=2.80$ |
|  |  |  | $R_5=33.60$ | $S_2=4.72$ |
| IV | 1.654 | 33.8 | $R_6=311.8$ | $T_4=6.81$ |
| V | 1.749 | 43.9 | $R_7=31.51$ | $T_5=8.59$ |
|  |  |  | $R_8=-55.87$ |  |

4. An optical projection system including a front collimating component, a rotatable dove prism for rotating an image with respect to an object, and an objective as claimed in claim 3.

References Cited

UNITED STATES PATENTS 3,482,901  12/1969  Melech.

DAVID SCHONBERG, Primary Examiner

P. A. SACHER, Assistant Examiner

U.S. Cl. X.R.

350—209